United States Patent
Kikkawa et al.

(10) Patent No.: US 6,555,603 B1
(45) Date of Patent: Apr. 29, 2003

(54) RESIN COMPOSITION FOR AGRICULTURAL FILM

(75) Inventors: Kazumi Kikkawa, Urawa (JP);
Tsutomu Matsuura, Urawa (JP);
Naoko Dai, Urawa (JP); Toshinori Yukino, Urawa (JP)

(73) Assignee: Asahi Denka Kogyo K.K., Tokyo (JP)

( * ) Notice: Subject to any disclaimer, the term of this patent is extended or adjusted under 35 U.S.C. 154(b) by 0 days.

(21) Appl. No.: 09/869,955
(22) PCT Filed: Nov. 10, 2000
(86) PCT No.: PCT/JP00/07966
§ 371 (c)(1), (2), (4) Date: Aug. 30, 2001
(87) PCT Pub. No.: WO01/34708
PCT Pub. Date: May 17, 2001

(30) Foreign Application Priority Data

Nov. 11, 1999 (JP) ............................................. 11-320560

(51) Int. Cl.$^7$ ............................ C08K 5/34; C08K 5/09; C08K 3/26
(52) U.S. Cl. ......................... 524/99; 524/102; 524/291; 524/427
(58) Field of Search ......................... 524/99, 102, 291, 524/427

(56) References Cited

U.S. PATENT DOCUMENTS

| 4,075,165 A | * | 2/1978 | Soma et al. | .................... 524/99 |
| 4,668,753 A | * | 5/1987 | Kashiwa et al. | ............ 526/348 |
| 5,096,950 A | | 3/1992 | Galbo et al. | |

FOREIGN PATENT DOCUMENTS

| JP | 11-158368 | 6/1999 |
| JP | 2000-336118 | 12/2000 |

* cited by examiner

Primary Examiner—Kriellion A. Sanders
(74) Attorney, Agent, or Firm—Nixon & Vanderhye PC

(57) ABSTRACT

A resin composition for agricultural film, which composition contains 100 parts by mass of a synthetic resin (A) and the below-specified amount of a polymer stabilizer (B).

Polymer stabilizer (B): an adduct obtained by adding a compound (b1) represented by the following formula (I) to a polymer (b2) having a molecular weight of at least 300:

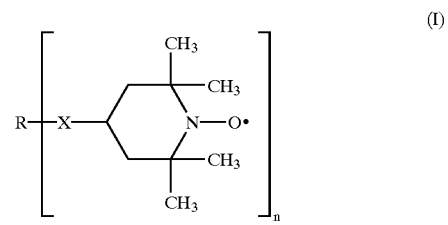

(wherein n represents an integer of 1–4; X represents —O— or —NH—; and R represents a hydrogen atom, a C1–C20 aliphatic acyl group, a C1–C20 aliphatic polyacyl group, a C1–C20 aromatic acyl group, or a C1–C20 aromatic polyacyl group).

Amount of polymer stabilizer (B): such an amount that makes the amount of nitrogen atoms contained in the polymer stabilizer (B) 0.0005–1 part by mass.

6 Claims, No Drawings

RESIN COMPOSITION FOR AGRICULTURAL FILM

TECHNICAL FIELD

The present invention relates to a resin composition for producing agricultural films. The composition provides films in which reduction in weatherability caused by sulfur fumigation or acid rain is suppressed. More particularly, the present invention relates to a resin composition for producing agricultural films exhibiting excellent long-term weatherability, which composition contains an adduct obtained through addition of a nitroxy compound to a predetermined polymer, the adduct serving as a polymer stabilizer.

BACKGROUND ART

Films formed from a polyethylene thermoplastic resin, such as polyethylene or an ethylene-vinyl acetate copolymer, or films formed from a polyester resin are used as agricultural films for forming, for example, a greenhouse or a plastic tent, since such films exhibit excellent transparency, heat-insulating ability, and mechanical strength. However, such a resin film cannot be used for a long period of time, because of deterioration caused by UV rays; e.g., impairment of transparency or breakage of the film.

As is well known, such impairment of the films can be suppressed by addition of an antioxidant, a UV absorber, a hindered amine compound, or a hydrotalcite compound. For example, Japanese Patent Application Laid-Open (kokai) No. Showa63-175072 discloses a method in which a hindered amine compound and hydrotalcite are incorporated in combination into a resin film, thereby stabilizing the film. U.S. Pat. No. 5,096,950 discloses a method in which a hindered amine compound having a nitroxyalkyl structure is incorporated into an agricultural polyolefin film.

However, the aforementioned additives fail to satisfactorily exert the effect of stabilizing agricultural resin films. When agricultural chemicals are sprinkled or sulfur fumigation is carried out for exterminating pests, agricultural resin films are impaired within a short period of time. Therefore, there has been demand for further stabilization of such agricultural films.

A nitroxy compound serving as a hindered amine compound exhibits an excellent effect of imparting light resistance to a resin film. However, a resin film containing a nitroxy compound is considerably colored, and thus in practice a nitroxy compound is not used in agricultural films.

From the viewpoint of conservation of resources, there has been demand for agricultural films exhibiting more excellent weatherability than ever.

DISCLOSURE OF THE INVENTION

An object of the present invention is to provide a resin composition for producing agricultural films, which are resistant to deterioration in weatherability caused by sulfur fumigation or acid rain.

In view of the foregoing, the present inventors performed extensive studies, and have found that a synthetic resin film containing a high-molecular-weight hindered amine stabilizer obtained through addition of a nitroxy compound to a polymer exhibits excellent long-term weatherability, and deterioration in weatherability of the resin film is small even when the resin film is subjected to sulfur fumigation. The present invention has been accomplished on the basis of this finding.

A first invention provides a resin composition for agricultural films, which composition comprises 100 parts by mass of a synthetic resin (A) and the below-specified amount of a polymer stabilizer (B).

Polymer stabilizer (B): an adduct obtained by adding a compound (b1) represented by the following formula (I) to a polymer (b2) having a molecular weight (mass average molecular weight, which has been conventionally called "weight average molecular weight") of at least 300:

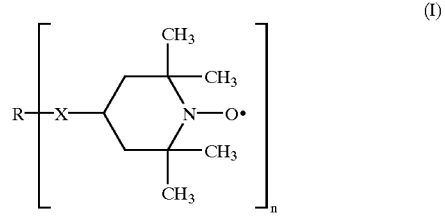

(wherein n represents an integer of 1–4; X represents —O— or —NH—; and R represents a hydrogen atom, a C1–C20 aliphatic acyl group, a C1–C20 aliphatic polyacyl group, a C1–C20 aromatic acyl group, or a C1–C20 aromatic polyacyl group).

Amount of polymer stabilizer (B): such an amount that makes the amount of nitrogen atoms contained in the polymer stabilizer (B) 0.0005–1 part by mass.

A second invention is drawn to a specific embodiment of the resin composition for agricultural films according to the first invention, wherein the polymer (b2) is a polyolefin.

A third invention is drawn to a specific embodiment of the resin composition for agricultural films according to the first or second invention, wherein the synthetic resin (A) is any one selected from among linear chain low-density polyethylene, low-density polyethylene, and an ethylene-vinyl acetate copolymer.

A fourth invention is drawn to a specific embodiment of the resin composition for agricultural films according to any one of the first to third inventions, wherein a hydrotalcite compound is further added to the composition.

A fifth invention is drawn to a specific embodiment of the resin composition for agricultural films according to any one of the first to fourth inventions, wherein a benzoate compound represented by the following formula (II) is added to the composition:

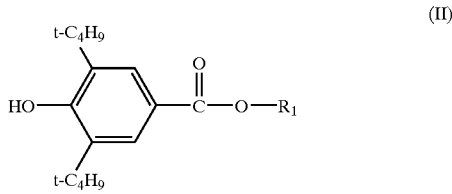

(wherein $R_1$ represents a C8–C30 linear chain or branched alkyl group).

A sixth invention provides a film formed from the resin composition for agricultural films as recited in any one of the first to fifth inventions.

BEST MODE FOR CARRYING OUT THE INVENTION

The present invention will next be described in detail.

Examples of the synthetic resin (A) employed in the present invention include polyolefins such as linear chain low-density polyethylene, low-density polyethylene, and polypropylene; ethylene-vinyl acetate copolymers; and polyesters. Of these, linear chain low-density polyethylene, low-density polyethylene, or an ethylene-vinyl acetate copolymer is preferred. Low-density polyethylene is particularly preferred.

Examples of aliphatic carboxylic acids for providing the aliphatic acyl group or aliphatic polyacyl group represented by R of the compound (b1) of formula (I) employed in the present invention include aliphatic monocarboxylic acids such as formic acid, acetic acid, propionic acid, butyric acid, valeric acid, caproic acid, caprylic acid, capric acid, lauric acid, myristic acid, palmitic acid, stearic acid, eicosanoic acid, acrylic acid, methacrylic acid, crotonic acid, oleic acid, and cyclohexanecarboxylic acid; and aliphatic polycarboxylic acids including aliphatic dicarboxylic acids such as oxalic acid, malonic acid, succinic acid, glutaric acid, adipic acid, azelaic acid, sebacic acid, maleic acid, and fumaric acid; aliphatic tricarboxylic acids such as propane-1,2,3-tricarboxylic acid, butane-1,2,3-tricarboxylic acid, and pentane-1,3,5-tricarboxylic acid; and aliphatic tetracarboxylic acids such as butanetetracarboxylic acid. Examples of aromatic carboxylic acids for providing aromatic carboxylic acid residues include aromatic monocarboxylic acids such as benzoic acid, p-methylbenzoic acid, p-tert-butylbenzoic acid, and naphthylic acid; and aromatic polycarboxylic acids such as phthalic acid, isophthalic acid, terephthalic acid, trimellitic acid, and pyromellitic acid.

Specific examples of the compound represented by formula (I) include the following compound Nos. 1 through 7. However, these examples should not be construed as limiting the present invention thereto.

-continued

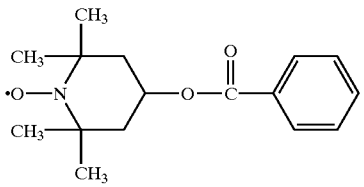

Compound No. 5

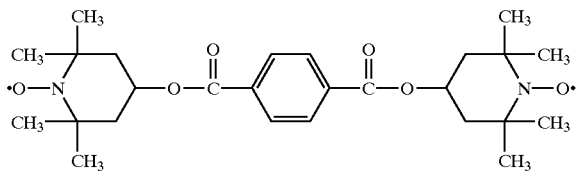

Compound No. 6

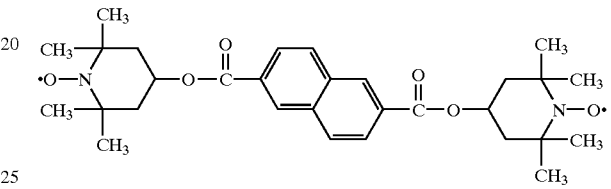

Compound No. 7

Examples of the polymer (b2) employed in the present invention include polyolefins such as polypropylene, high-density polyethylene, low-density polyethylene, and linear-chain low-density polyethylene; and polymers having an unsaturated bond such as ethylene-propylene-diene rubber, polybutadiene, and acrylonitrile-butadiene-styrene copolymers. Particularly, in consideration of compatibility between the resultant polymer stabilizer and the synthetic resin (A), the polymer (b2) is preferably a polymer similar to the synthetic resin (A). From the viewpoint of attaining a long-term stabilizing effect which is obtainable when the polymer (b2) is satisfactorily retained in the resin, the mass average molecular weight of the polymer (b2) is preferably 300 or more. The upper limit of the molecular weight is not particularly limited, so long as the polymer stabilizer (B) is compatible with the synthetic resin (A).

The method for synthesizing the compound (b1) is not particularly limited, and the compound may be synthesized through any known method. Examples of the method for adding the compound (b1) to the polymer (b2) include a method employing a peroxide and a method employing radioactive rays.

The nature of the addition of the compound (b1) (i.e., a nitroxy compound) to the polymer (b2) is that nitroxy radicals are added to polymer radicals formed through removal of hydrogen radicals from the polymer (b2)—the radicals being generated by the action of highly active radicals of a peroxide or by irradiation with radioactive rays—to thereby form a structure in which the hindered amine compound is added, via an oxygen atom, to the polymer.

When the resin composition for agricultural films of the present invention is produced, the polymer stabilizer (B) is added to the synthetic resin (A) such that the amount of a nitrogen atom derived from a piperazine ring of the compound (b1) contained in the polymer stabilizer (B) is 0.0005–1 part by mass, preferably 0.005–1 part by mass, with respect to 100 parts by mass of the synthetic resin (A). When the amount of the nitrogen atom is 0.0005 parts by mass or more, deterioration in weatherability of the resultant agricultural films, which is caused by sulfur fumigation or acid rain, is suppressed. Moreover, when the amount of the nitrogen atom is 1 part by mass or less, effects and costs are both satisfactory. No particular limitation is imposed on the method for producing the resin composition for agricultural films of the present invention. The polymer stabilizer (B) may be incorporated into the synthetic resin (A) through a known method making use of, for example, a ribbon blender, or a Henschel mixer, for blending a stabilizer with a synthetic resin. If necessary, an extruder or a Banbury mixer may be used.

No particular limitation is imposed on the method for forming an agricultural film from the resin composition of the present invention, and any known formation method, such as extrusion molding making use of a T die or inflation film extrusion, may be chosen in accordance with the type of the synthetic resin employed. Such formation of film may be carried out subsequent to production of the resin composition for agricultural films of the present invention.

In accordance with the type of the synthetic resin (A) employed or conditions for producing crops by use of the agricultural film, the resin composition for agricultural films of the present invention preferably contains, in accordance with needs, an additive such as a phenolic antioxidant, a sulfur-containing antioxidant, a phosphorus-containing antioxidant, a UV absorber, another hindered amine compound, a nucleating agent, hydrotalcite serving as a decatalyzing agent, an anti-fog agent, an anti-mist agent, an anti-drop agent, metallic soap, an epoxy compound, a perchlorate, a lubricant, a modifier, an IR absorber, a filler, a pigment, or an antistatic agent.

Examples of the aforementioned phenolic antioxidant include 2,6-di-tert-butyl-p-cresol, 2,6-diphenyl-4-octadecyiloxyphenol, distearyl(3,5-di-tert-butyl-4-hydroxybenzyl)phosphonate, 1,6-hexamethylenebis[(3,5-di-tert-butyl-4-hydroxyphenyl)propionic acid amide], 4,4'-thiobis (6-tert-butyl-m-cresol), 2,2'-methylenebis (4-methyl-6-tert-butylphenol), 2,2'-methylenebis(4-ethyl-6-tert-butylphenol), 4,4'-butylidenebis(6-tert-butyl-m-cresol), 2,2'-ethylidenebis (4,6-di-tert-butylphenol), 2,2'-ethylidenebis (4-sec-butyl-6-tert-butylphenol), 1,1,3-tris(2-methyl-4-hydroxy-5-tert-butylphenyl)butane, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 2-tert-butyl-4-methyl-6-(2-acryloyloxy-3-tert-butyl-5-methylbenzyl)phenol, stearyl(3,5-di-tert-butyl-4-hydroxyphenyl)propionate, thiodiethyleneglycol bis[(3,5-di-tert-butyl-4-hydroxyphenyl)propionate], 1,6-hexamethylenebis[(3,5-di-tert-butyl-4-hydroxyphenyl) propionate], bis[3,3-bis(4-hydroxy-3-tert-butylphenyl) butyric acid]glycol ester, bis[2-tert-butyl-4-methyl-6-(2-hydroxy-3-tert-butyl-5-methylbenzyl)phenyl]terephthalate, 1,3,5-tris[(3,5-di-tert-butyl-4-hydroxyphenyl) propionyloxyethyl]isocyanurate, tetrakis[methylene-3-(3', 5'-di-tert-butyl-4'-hydroxyphenyl)propionate]methane, 3,9-bis[1,1-dimethyl-2-{(3-tert-butyl-4-hydroxy-5-methylphenyl)propionyloxy}ethyl]-2,4,8,10-tetraoxaspiro [5.5]undecane, and triethyleneglycol bis[(3-tert-butyl-4-hydroxy-5-methylphenyl)propionate]. The amount of such a phenolic antioxidant employed is 0.01–10 parts by mass, preferably 0.05–5 parts by mass, with respect to 100 parts by mass of the synthetic resin (A). The amount of the below-described additive, which is arbitrarily added to the synthetic resin (A), is 0.01–10 parts by mass, preferably 0.05–5 parts by mass, with respect to 100 parts by mass of the resin (A).

Examples of the aforementioned sulfur-containing antioxidant include dialkyl thiodipropionates such as dilauryl thiodipropionate, dimyristyl thiodipropionate, and distearyl thiodipropionate; and polyol β- alkylmercaptopropionate esters such as pentaerythritol tetra(β-dodecylmercaptopropionate).

Examples of the aforementioned phosphorus-containing antioxidant include trisnonylphenyl phosphite, tris(2,4-di-tert-butylphenyl)phosphite, tris[2-tert-butyl-4-(3-tert-butyl-4-hydroxy-5-methylphenylthio)-5-methylphenyl]phosphite, tridecyl phosphite, octyldiphenyl phosphite, di(decyl) monophenyl phosphite, di(tridecyl)pentaerythritol diphosphite, di(nonylphenyl)pentaerythritol diphosphite, bis (2,4-di-tert-butylphenyl)pentaerythritol diphosphite, bis(2, 6-di-tert-butyl-4-methylphenyl)pentaerythritol diphosphite, bis(2,4,6-tri-tert-butylphenyl)pentaerythritol diphosphite, bis(2,4-dicumylphenyl)pentaerythritol diphosphite, tetra (tridecyl)isopropylidenediphenol diphosphite, tetra (tridecyl)-4,4'-n-butylidene bis(2-tert-butyl-5-methylphenol)diphosphite, hexa(tridecyl)-1,1,3-tris(2-methyl-4-hydroxy-5-tert-butylphenyl)butane triphosphite, tetrakis(2,4-di-tert-butylphenyl)biphenylene diphosphonite, 9,10-dihydro-9-oxa-10-phosphaphenanthrene-10-oxide, 2,2'-methylenebis(4,6-tert-butylphenyl)-2-ethylhexylphosphite, 2,2'-methylenebis(4,6-tert-butylphenyl)-octadecyl phosphite, 2,2'-ethylidenebis (4,6-di-tert-butylphenyl)fluorophosphite, tris(2-[(2,4,8,10-tetrakis-tert-butyldibenzo [d,f][1,3,2]dioxaphosphepin-6-yl) oxy]ethyl)amine, and a phosphite of 2-ethyl-2-butylpropylene glycol and 2,4,6-tri-tert-butylphenol.

Examples of the aforementioned UV absorber include 2-hydroxybenzophenones such as 2,4-dihydroxybenzophenone, 2-hydroxy-4-methoxybenzophenone, 2-hydroxy-4-octoxybenzophenone, and 5,5'-methylenebis(2-hydroxy-4-methoxybenzophenone); 2-(2'-hydroxyphenyl) benzotriazoles such as 2-(2'-hydroxy-5'-methylphenyl) benzotriazole, 2-(2'-hydroxy-3',5'-di-tert-butylphenyl)-5-chlorobenzotriazole, 2-(2'-hydroxy-3'-tert-butyl-5'-methylphenyl)-5-chlorobenzotriazole, 2-(2'-hydroxy-5'-tert-octylphenyl)benzotriazole, 2-(2'-hydroxy-3',5'-dicumylphenyl)benzotriazole, 2,2'-methylenebis(4-tert-octyl-6-benzotriazolyl)phenol, and 2-(2'-hydroxy-3'-tert-butyl-5'-carboxyphenyl)benzotriazole; benzoates such as phenyl salicylate, resorcinol monobenzoate, 2,4-di-tert-butylphenyl 3,5-di-tert-butyl-4-hydroxybenzoate, 2,4-di-tert-amylphenyl 3,5-di-tert-butyl-4-hydroxybenzoate, and hexadecyl 3,5-di-tert-butyl-4-hydroxybenzoate; substituted oxanilides such as 2-ethyl-2'-ethoxyoxanilide and 2-ethoxy-4'-dodecyloxanilide;

cyanoacrylates such as ethyl α-cyano-β,β-diphenylacrylate and methyl 2-cyano-3-methyl-3-(p-methoxyphenyl)acrylate; and triaryltriazines such as 2-(2-hydroxy-4-octoxyphenyl)-4,6-bis(2,4-di-tert-butylphenyl)-s-triazine, 2-(2-hydroxy-4-methoxyphenyl)-4,6-diphenyl-s-triazine, and 2-(2-hydroxy-4-propoxy-5-methylphenyl)-4,6-bis(2,4-di-tert-butylphenyl)-s-triazine.

Of the aforementioned UV absorbers, a compound represented by the following formula (II) is preferred, since it exerts an excellent effect of improving the weatherability of the resin composition:

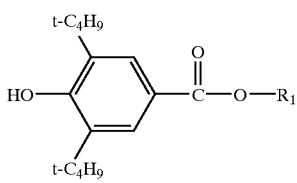

(II)

(wherein $R_1$ represents a C8–C30 linear chain or branched alkyl group).

Examples of the aforementioned "another hindered amine compound" include 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl)sebacate, bis(1,2,2,6,6-pentamethyl-4-piperidyl)sebacate, bis(1-octoxy-2,2,6,6-tetramethyl-4-piperidyl)sebacate, tetrakis(2,2,6,6-tetramethyl-4-piperidyl)butanetetracarboxylate, tetrakis(1,2,2,6,6-pentamethyl-4-piperidyl)-1,2,3,4-butanetetracarboxylate, bis(2,2,6,6-tetramethyl-4-piperidyl)-di(tridecyl) 1,2,3,4-butanetetracarboxylate, bis(1,2,2,6,6-pentamethyl-4-piperidyl)-di(tridecyl)-1,2,3,4-butanetetracarboxylate, bis(1,2,2,6,6-pentamethyl-4-piperidyl)-2-butyl-2-(3,5-di-tert-butyl-4-hydroxybenzyl)malonate, 1-(2-hydroxyethyl)-2,2,6,6-tetramethyl-4-piperidinol/diethyl succinate polycondensates, 1,6-bis(2,2,6,6-tetramethyl-4-piperidylamino)hexane/dibromoethane polycondensates, 1,6-bis(2,2,6,6-tetramethyl-4-piperidylamino)hexane/2,4-dichloro-6-morpholino-s-triazine polycondensates, 1,6-bis(2,2,6,6-tetramethyl-4-piperidylamino)hexane/2,4-dichloro-6-tert-octylamino-s-triazine polycondensates, 1,5,8,12-tetrakis[2,4-bis(N-butyl-N-(2,2,6,6-tetramethyl-4-piperidyl)amino)-s-triazin-6-yl]-1,5,8,12-tetraazadodecane, 1,5,8,12-tetrakis[2,4-bis(N-butyl-N-(1,2,2,6,6-pentamethyl-4-piperidyl)amino)-s-triazin-6-yl]-1,5,8,12-tetraazadodecane, 1,6,11-tris[2,4-bis(N-butyl-N-(2,2,6,6-tetramethyl-4-piperidyl)amino)-s-triazin-6-ylamino]undecane, and 1,6,11-tris[2,4-bis(N-butyl-N-(1,2,2,6,6-pentamethyl-4-piperidyl)amino)-s-triazin-6-ylamino]undecane.

Examples of the aforementioned nucleating agent include sorbitols, bis(4-tert-butylphenyl)phosphate alkali metal salts, 2,2'-methylenebis(4,6-di-tert-butylphenyl)phosphate metal salts, aluminum bis(4-tert-butylbenzoate), and amino acid metal salts.

The aforementioned hydrotalcite may be a naturally occurring product or a synthetic product. The hydrotalcite may be modified with an alkali metal such as lithium. Particularly, the hydrotalcite having the composition represented by the following formula (III) is preferred, and the hydrotalcite may be used irrespective of the presence of crystal water or surface treatment. The particle size of the hydrotalcite is not particularly limited. However, the particle size is preferably small, so long as characteristics of the hydrotalcite are not lost. When the particle size is large, dispersibility of the hydrotalcite is low, and thus the hydrotalcite may fail to provide the effect of stabilizing the resin composition. In addition, physical properties of the resultant resin composition, such as mechanical strength and transparency, are deteriorated.

$$Zn_xMg_yAl_2(OH)_{2(x+y+2)}CO_3 \cdot nH_2O \qquad (III)$$

(wherein x represents 0 to 3; y represents 1 to 6; x+y is 4 to 6; and n represents 0 to 10.)

EXAMPLES

The present invention will next be described in detail by way of Examples, which should not be construed as limiting the invention thereto. Throughout the Examples, the symbol "%" represents "mass%."

Synthesis Example-1

Synthesis of Adduct-1

A nitroxy compound (compound No. 1) (5 parts by mass) was added to low-density polyethylene having an average molecular weight of 100,000 (100 parts by mass). Dicumyl peroxide was further added to the resultant mixture such that its equivalent was equal to that of the nitroxy compound. The resultant mixture was mixed by use of a Henschel mixer, and the resultant resin composition was subjected to extrusion molding at 200° C., to thereby obtain pellets. The resultant pellets were subjected to extraction at 70° C. for 10 hours by use of chloroform serving as an extraction solvent of the nitroxy compound, to thereby extract 47% of the added nitroxy compound from the pellets. Addition of the nitroxy compound to the polyethylene was verified on the basis of the nitrogen content of the pellets which had undergone extraction. The resultant nitroxy-compound-added low-density polyethylene (nitrogen content: 0.15%) obtained through extraction is called adduct-1.

Synthesis Example-2

The procedure of Synthesis Example-1 was repeated, except that the nitroxy compound (compound No. 1) was replaced by compound No. 2, to thereby obtain adduct-2 (nitrogen content: 0.11%).

Synthesis Example-3

A nitroxy compound (compound No. 3) (5 parts by mass) was added to EPDM (100 parts by mass), and the resultant mixture was mixed by use of a Henschel mixer, to thereby obtain a resin composition. The resultant resin composition was irradiated with γ rays at 500 kGy. After completion of irradiation, the composition was subjected to aging in an oven at 120° C. for 24 hours, and then subjected to extrusion molding at 200° C., to thereby obtain pellets. The resultant pellets were subjected to extraction in a manner similar to that of Synthesis Example-1. Addition of the nitroxy compound to the EPDM was verified on the basis of the nitrogen content of the pellets which had undergone extraction. The resultant nitroxy-compound-added EPDM (nitrogen content: 0.06%) is called adduct-3.

Example 1, Comparative Example 1

To low-density polyethylene (YK-30: product of Mitsubishi Chemical Corporation) (100 parts by mass) were added tetrakis[methylene-3-(3',5'-di-tert-butyl-4-hydroxyphenyl)propionate]methane (0.05 parts by mass), bis(2,6-di-tert-butyl-4-methylphenyl)pentaerythritol diphosphite (0.1 parts by mass), hydrotalcite (product name: Alcamizer-4, product of Kyowa Chemical Industry Co., Ltd.) (0.1 parts by mass), glycerin monostearate (0.8 parts by mass), hexadecyl 3,5-di-tert-butyl-4-hydroxybenzoate (0.1 parts by mass), and a nitroxy adduct shown in Table-1 (parts by mass shown in Table-1) (the nitrogen content of the adduct was equal to that of the adduct of Example 1-1). The resultant mixture was mixed by use of a mixer, and then subjected to extrusion molding by use of a T die at 220° C., to thereby obtain a film having a thickness of 50 μm. The resultant film was cut into 10 tetragonal test pieces each having a size of 1 cm×3 cm. The test pieces were placed in a 100-liter container, and fumigated for one hour with sulfur (3 g) heated by a hot plate. The resultant test pieces of the film were placed in a sunshine weatherometer at 83° C. The carbonyl indices of the test pieces were measured after the test pieces had held in the weatherometer for 120 hours, 480 hours, and 960 hours, to thereby evaluate the weatherability of the film. The results are shown in Table-1. In Comparative Example 1, the procedure of Example 1 was repeated, except that the adduct-1 was replaced by Comparative compound-1, -2, or -3, to thereby obtain a film, and the weatherability of the film was evaluated in a manner similar to that of Example 1.

The carbonyl index is calculated on the basis of the IR spectroscopic analysis data of the film, and is defined by $[\log(I_o/I)]/d$ (wherein Io represents the % transmission of the film at 1710 cm$^{-1}$ before impairment; I represents the % transmission of the film after impairment; and d represents the thickness (cm) of the film).

TABLE 1

| | Nitroxy adduct | | | |
|---|---|---|---|---|
| | | Amount | Carbonyl index | | |
| | Compound | of addition | After 120 hours | After 480 hours | After 960 hours |
| Ex. | | | | | |
| 1-1 | Adduct-1 | 6.53 | 0.02 | 0.03 | 0.07 |
| 1-2 | Adduct-2 | 8.92 | 0.02 | 0.02 | 0.09 |
| 1-3 | Adduct-3 | 17.1 | 0.02 | 0.04 | 0.09 |
| Comp. Ex. | | | | | |
| 1-1 | Comparative compound-1*[1] | 0.245 | 0.03 | 0.29 | 0.38 |
| 1-2 | Comparative compound-2*[2] | 0.200 | 0.04 | 0.09 | 1.13 |
| 1-3 | Comparative compound-3*[3] | 0.174 | 0.04 | 0.33 | 1.47 |

The comparative compounds marked with *1, *2, and *3 shown in Table-1 are as follows:

*1: bis(1-octoxy-2,2,6,6-tetramethyl-4-piperidyl) sebacate;

*2: condensation product of 1,6-bis(2,2,6,6-tetramethylpiperidylamino)hexane and 2,4-dichloro-6-tert-octyl-s-triazine; and

*3: bis(1,2,2,6,6-pentamethyl-4-piperidyl)sebacate.

Example-2

To low-density polyethylene (YK-30) (100 parts by mass) were added bis(2,4-di-tert-butylphenyl)pentaerythritol diphosphite (0.05 parts by mass), 2,4-di-tert-butylphenyl 3,5-di-tert-butyl-4-hydroxybenzoate (0.1 parts by mass), and a nitroxy adduct shown in Table-2. The resultant mixture was subjected to extrusion molding at 220° C. by use of a T die in a manner similar to that of Example 1, to thereby obtain a film having a thickness of 50 μm.

The resultant film was cut into 10 tetragonal test pieces each having a size of 1 cm×3 cm. The test pieces were placed in a 100-liter container, and fumigated for one hour with sulfur (3 g) heated by a hot plate.

The sulfur-fumigated test pieces of the film were placed in a xenon weatherometer at 63° C. The carbonyl indices of the test pieces were measured after the test pieces had held in the weatherometer for 240 hours, 480 hours, and 960 hours, to thereby evaluate the weatherability of the film. The results are shown in Table-2.

TABLE 2

| | Nitroxy adduct | | | |
|---|---|---|---|---|
| | | Amount | Carbonyl index | | |
| | Compound | of addition | After 240 hours | After 480 hours | After 960 hours |
| Ex. | | | | | |
| 2-1 | Adduct-1 | 6.52 | 0.03 | 0.04 | 0.09 |
| 2-2 | Adduct-2 | 8.92 | 0.04 | 0.03 | 0.07 |
| 2-3 | Adduct-3 | 17.1 | 0.04 | 0.04 | 0.09 |
| Comp. Ex. | | | | | |
| 2-1 | Comparative compound-1 | 0.245 | 0.05 | 0.11 | 0.53 |
| 2-2 | Comparative compound-2 | 0.200 | 0.04 | 0.33 | 1.63 |
| 2-3 | Comparative compound-3 | 0.174 | 0.07 | 0.45 | 2.32 |

Industrial Applicability

Agricultural films exhibiting excellent weatherability (particularly when exposed to an acidic atmosphere such as a sulfur fumigation atmosphere) can be produced from a resin composition for agricultural films, which composition is obtained by adding a nitroxy-compound-added polymer (polymer stabilizer (B)) of the present invention to a resin for agricultural films serving as a synthetic resin (A).

What is claimed is:

1. A resin composition for agricultural film, which composition comprises 100 parts by mass of a synthetic resin (A) and the below-specified amount of a polymer stabilizer (B):

polymer stabilizer (B): an adduct obtained by adding a compound (b1) represented by the following formula (I) to a polymer (b2) having a molecular weight of at least 300:

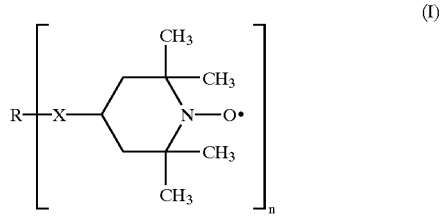

(I)

(wherein n represents an integer of 1–4; X represents —O— or —NH—; and R represents a hydrogen atom, a C1–C20 aliphatic acyl group, a C1–C20 aliphatic polyacyl group, a C1–C20 aromatic acyl group, or a C1–C20 aromatic polyacyl group);

amount of polymer stabilizer (B): such an amount that makes the amount of nitrogen atoms contained in the polymer stabilizer (B) 0.0005–1 part by mass.

2. A resin composition for agricultural film according to claim 1, wherein the polymer (b2) is a polyolefin.

3. A resin composition for agricultural film according to claim 1, wherein the synthetic resin (A) is any one selected from among linear chain low-density polyethylene, low-density polyethylene, and an ethylene-vinyl acetate copolymer.

4. A resin composition for agricultural film according to claim 1, which composition further comprises a hydrotalcite compound.

5. A resin composition for agricultural film according to claim 1, which composition further comprises a benzoate compound represented by the following formula (II):
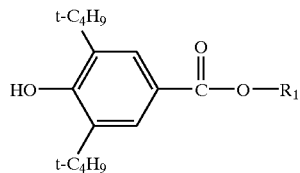
(wherein $R_1$ represents a C8–C30 linear chain or branched alkyl group).
6. A film formed from a resin composition for agricultural film as recited in claim 1.
* * * * *